Feb. 4, 1930.　　　　P. P. ALEXANDER　　　　1,746,207
METHOD AND APPARATUS FOR ELECTRIC ARC WELDING
Filed Dec. 26, 1924
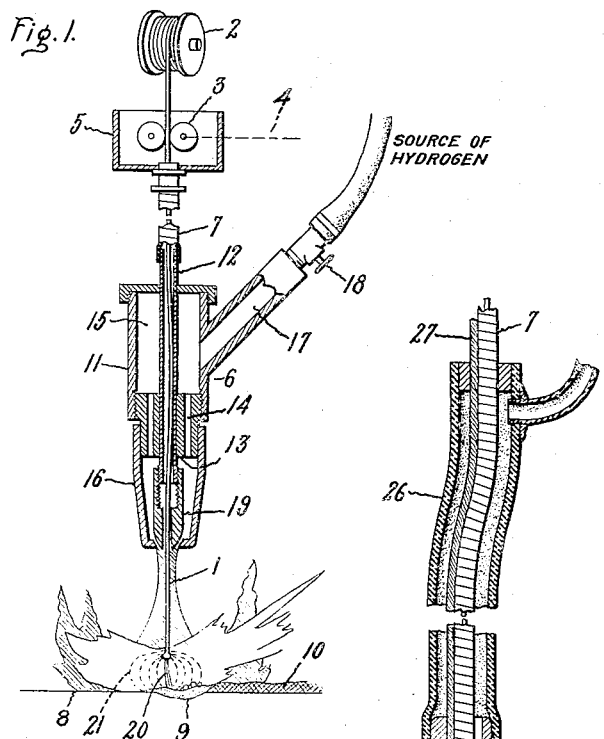
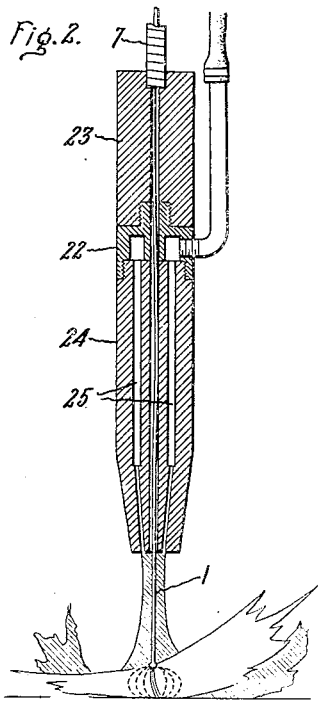
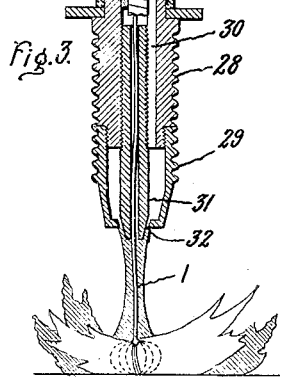
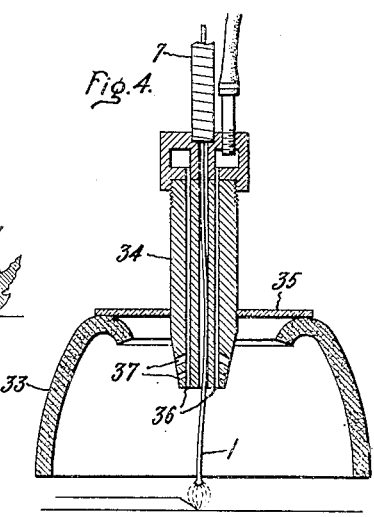
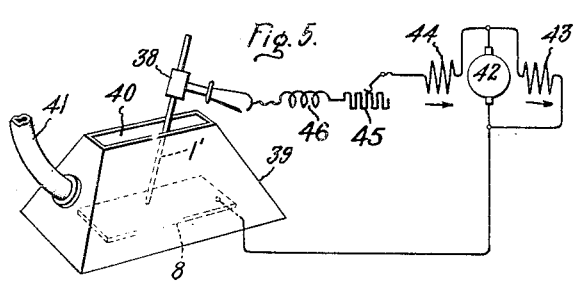
Inventor:
Peter P. Alexander,
by *His Attorney*.

Patented Feb. 4, 1930

1,746,207

UNITED STATES PATENT OFFICE

PETER P. ALEXANDER, OF MARBLEHEAD, MASSACHUSETTS, ASSIGNOR TO GENERAL ELECTRIC COMPANY, A CORPORATION OF NEW YORK

METHOD AND APPARATUS FOR ELECTRIC ARC WELDING

Application filed December 26, 1924. Serial No. 758,082.

My invention relates to electric arc welding of the type wherein the welding arc is maintained between the work to be welded, which is connected to one side of a suitable supply circuit, and a welding pencil or welding electrode which is connected to the other side of the supply circuit. The work to be welded thus constitutes one of the electrodes between which the arc is maintained, the other being the welding pencil or welding electrode as it is variously termed. This type of electric arc welding is well known and has been employed commercially to a wide extent in various operations of construction and repair. The field of application of this type of welding is, however, limited by the fact that the welds are characterized by lack of ductility.

An object of my invention is to provide an improved process and an improved apparatus which shall enable sound, strong, ductile and reliable welds to be produced.

Further objects of my invention are to provide an improved process and apparatus which shall lessen the work necessary in preparation of the work for welding, which shall greatly increase the heating effect of the arc for any given welding current, and which shall permit of a wide adjustment of the voltage of the arc while still producing sound, strong, ductile and reliable welds, whereby the speed of welding is greatly increased, the welding of sheets or plates varying from thin stock to stock at least an inch thick made possible without beveling the edges, and the quality of the welded metal rendered independent of wide variations in arc length.

My invention will be better understood on reference to the following specification taken in connection with the accompanying drawing, and its scope will be pointed out in the appended claims.

In the drawing Figs. 1, 2, 3 and 4 show various embodiments of my invention for electric arc welding adapted for semi-automatic or fully automatic welding, where automatic means are provided for feeding a metallic electrode, and Fig. 5 shows one example of an arrangement for hand welding wherein no automatic means is provided for feeding the electrode.

The relative brittleness of welds made by the electric arc process is ascribed to various causes. The metal of the weld is subjected to an extremely high temperature for a considerable interval of time and at such temperature compounds are formed which impart a brittle quality to the metal. When the metal is oxidized it is porous and brittle, but it is not sufficient to exclude atmospheric oxygen. It is now generally recognized that one of the principal causes of brittleness is the presence of nitrides in the welded metal. Nitrogen forms such a large proportion of atmospheric air and the amount of nitrogen in combination required to destroy ductility is so small that welding in air is the full equivalent, in this respect, of welding in pure nitrogen. I have, indeed, made welds in an atmosphere of pure dry nitrogen, supplied in such a way as to surround the arc, blanket the molten metal of the work and totally exclude atmospheric air, and the welds were in every case brittle. The best weld I was able to make in pure nitrogen was no better than the average weld in air and most of the welds were not as good. It is possible and probable that at the high temperature of the arc the nitrogen is more or less disassociated and becomes active to combine with the boiling metal of the crater of the arc to form the iron nitrides so detrimental to the weld. Moreover, although atmospheric air was excluded, there were always some oxides present in the weld, indicating the presence of oxide in the plates being welded or the presence of occluded oxygen. The striking and arc voltages of a welding arc maintained in nitrogen are each two or three volts lower than the corresponding voltages of a welding arc maintained in air.

I have also welded in an atmosphere of carbon-dioxide and in an atmosphere of illuminating gas and in every case the welds were brittle and not as good as welds made in air.

In accordance with my invention the welding arc is maintained in an atmosphere of hydrogen which surrounds or envelops the arc, excludes atmospheric air from the arc and the molten portion of the work, and exerts a strong reducing action on the molten metal of the work. Hydrogen at high temperature is a most powerful reducing reagent. It is non-reactive to form compounds with the metal of the weld and has a strong reducing action on compounds of the metal which tend to make the weld brittle.

My invention is particularly adapted to the so-called metallic arc welding process wherein the welding arc is maintained between a metallic electrode and the work, the metal of the electrode being fused and vaporized and deposited upon the work and integrally united therewith. I have found that the voltage of a welding arc in hydrogen is about double the voltage of the corresponding arc in air. The critical arc voltage is about 38 volts as a minimum. At this voltage the arc is extinguished. The metal is deposited at about 2½ times the rate of deposition for the same welding current in air.

The increased speed and economy of the hydrogen process is indicated by the fact that I have butt welded by this process steel plates ½" in thickness, without beveling the edges, at a speed of 30 feet per hour. The average speed for arc welding in air attained by the best obtainable hand welders on ½" stock, with the edges beveled 90°, is about 2 feet per hour. A speed of 1.3 feet per hour using 180 amperes with an arc voltage of 22 volts is representative of such welding of ½" plate in air. The speed in hydrogen is, therefore, many times the speed in air. The welds in hydrogen are moreover perfectly ductile. They can be bent through an angle of substantially 180° without cracking. A test piece machined from metal deposited from a mild steel electrode showed the following results:

Elastic limit 42,000 lbs. per square inch.
Tensile strength 57,800 lbs. per square inch.
Elongation 36%.
Reduction of area 55%.

I have welded sheets and plates up to at least one inch in thickness by the metallic arc in hydrogen with and also without beveling the edges. It is of no advantage to clean the line of the joint prior to welding, since the hydrogen reduced the oxide of the plates in addition to preventing the formation of oxides by the oxygen of the air or the occluded oxygen of the electrode or plates. The decreased expense of preparation of the work and the increased speed of welding thus more than offsets the cost of the quantity of hydrogen used which, as hereinafter pointed out, is not great.

I have discovered that a welding arc in hydrogen may be maintained provided the striking voltage of the supply circuit is greater than 120 volts. This is the critical voltage below which an arc cannot be continuously maintained between the electrode and the work in hydrogen. Where using an electrode containing an arc sustaining flux containing for example, a sodium titanate as disclosed in Letters Patent to James C. Armor, No. 1,374,711, dated April 12, 1921, I have used striking voltages of from 130 to 180 volts. I prefer to use a suitable arc sustaining flux when depositing special alloys. Where the supply circuit has a striking voltage of about 180 volts I have found the arc to be stable with any bare electrode, but with bare electrodes it is advantageous to have a striking voltage of from 180 to 200 volts. As heretofore stated the critical arc voltage is about 38 volts. An arc voltage of 40 to 50 volts is satisfactory and while the upper limit of arc voltage is not fixed, I at present prefer to use arc voltages between 40 and 100. The arc voltage varies with the arc length and it is thus apparent that wide variations in arc length may occur without damaging the deposited metal. The length of the 100-volt arc is about ¾ inches; the 60-volt arc from $\frac{3}{16}$ to ¼ inches, and the 40-volt arc about $\frac{1}{16}$ inches. It is therefore not essential that the arc length be maintained substantially constant with anything approximating the degree of accuracy which is essential when welding in air where the arc must be kept short, and a long arc renders the weld worthless.

I have used welding currents as low as 20 amperes and as high as 250 amperes with perfect results and higher currents may be used if desired. The high normal arc voltage and the wide range of arc voltages available make it possible to secure a much greater heating effect with the arc in hydrogen than in air for the same current, and with high arc voltage and high current the energy available is tremendous, thus making it possible to weld very heavy stock expeditiously.

Any suitable source of welding current may be used as long as it has a sufficiently high striking voltage available as heretofore indicated. By a minimum striking voltage of 120 volts, I do not mean that this voltage should be available merely to strike the arc in the first instance and that the arc may thereafter be maintained from a source the maximum voltage of which is less than that value. On the contrary, such minimum voltage should be available instantly at all times to maintain the arc in hydrogen. The arc may be supplied from a constant voltage source through a series stabilizing resistance as in ordinary arc welding in air. The arc may also be supplied from a regulated source of either the variable current type or the constant current type. The voltage of such a source accommodates itself to the condition of the arc and avoids the power loss due to a stabilizing resistance as is well known. For example, a generator of the type shown in Letters Patent to Sven. R. Bergman, No.

1,340,004, dated May 11, 1920, may be used provided the open circuit or striking voltage is sufficiently high. It is preferable to include a reactance in series with the welding circuit to assist in maintaining the arc as is well-known in arc welding in air.

It is possible to use an auxiliary source which supplies a moderate current and provides the striking voltage and supply the remainder of the welding current from a source of lower voltage. I have found it desirable, however, in direct current work to provide the main source with a striking voltage of not less than 105 volts, even for arc voltages near the lower limit.

In hydrogen arc welding with the metallic electrode it is preferable to use direct current and connect the work to the positive side of the welding circuit and connect the welding pencil or electrode to the negative side. The arc is more stable and easily maintained when the work is positive and the electrode negative than when the welding pencil or electrode is positive and the work negative. The rate of metal deposition is greater when the electrode is positive but I have found that a higher striking voltage is necessary to maintain the arc. Metal deposition with such reversed polarity can however be successfully used for certain work such, for example, as melting down metal for filling purposes. With alternating current the striking voltage should be still higher and preferably of the order of 300 volts, and the arc voltage is higher. With a fluxed electrode I have used an arc voltage of 80 volts with alternating current.

While my invention is especially advantageous for metallic arc welding it is not limited to such welding. It is also adapted, under proper conditions, for use with other electrodes such, for example, as a carbon electrode or pencil. When a carbon electrode is used the edges of the work may be fused and welded together with or without the use of a filler rod fed into the arc or laid along the line of the joint as in carbon arc welding in air. With the carbon arc in hydrogen I have found that it is necessary to have the work positive and the welding pencil negative to produce a ductile weld. A weld so made is sound and ductile and presents a fine appearance. If, however, the polarity is reversed the weld will be hard and brittle. Where the carbon electrode is negative its consumption or wearing away in hydrogen is very small and appears to be due only to a slight electro-vaporization.

I have found that my hydrogen arc process is suitable for welding cast iron. For this work I prefer to use a fluxed electrode as heretofore described, but I have also used bare electrodes. I have also used a carbon electrode and a cast iron filler rod with good results. One of the advantages for cast iron welding is that the hydrogen prevents the burning out of silicon and graphite.

My hydrogen arc welding process may be used with apparatus arranged for semi-automatic welding or fully automatic welding wherein means are provided for feeding the electrode automatically, and may also be used with hand welding apparatus involving no means for automatically feeding the electrode.

In Fig. 1 of the drawing I have shown an embodiment of my invention particularly adapted for metallic arc welding wherein means are provided for automatically feeding a metallic electrode through a welding tool and wherein means are provided for supplying hydrogen to surround the arc, contact with the molten portion of the work and exclude atmospheric air. The metallic electrode or pencil 1 is indicated as being drawn from a reel 2 by means of feed rolls 3 driven by suitable means as hereinafter described, such means being diagrammatically indicated by the dotted shaft 4. The feed rolls are indicated as mounted in a suitable welding head 5. The electrode is shown as being fed through an electrode and gas delivery device or welding tool 6, and is represented as guided from the welding head to the tool by a flexible electrode guide tube 7.

The work to be welded is diagrammatically indicated at 8 and the welding arc is struck and maintained between the work 8 and the electrode 1. The work is connected to one side of a suitable supply circuit and the electrode 1 is connected to the other side of the supply circuit as heretofore stated. The molten portion of the work is indicated at 9 and the solidified metal which has been deposited along the line of the joint to be welded is indicated at 10.

The welding tool shown in Fig. 1 comprises a body member 11 through the top of which projects the tube 12 which is connected to the electrode guide tube 7. The body member 11 is provided with a plug 13 shown threaded into the lower end thereof. The plug 13 is provided with a series of openings 14 leading from the chamber 15 in the body member 11 to the interior of the nozzle piece 16 which is secured in any desired manner with a tight joint to the plug 13. The tube 17 is connected to a source of hydrogen under pressure. A flexible hose connection permits the tool to be held in any desired position. A valve 18 is indicated in the hydrogen supply connection for controlling the supply of hydrogen to the tool. The hydrogen enters the chamber 15 and passes through the openings 14 into the interior of the nozzle 16 and is delivered in a stream surrounding the electrode. As shown, the tube 12 is provided with an adjustable member 19 which cooperates with the cap 16 to determine the size of the orifice through which the hydrogen issues. By adjusting the member 19 on the tube 12 the size of the orifice may be adjusted. My invention is not limited to any particular construction of tool nor size and shape of orifice. I have found that successful results may be secured with many different arrangements as long as sufficient hydrogen is supplied to surround the arc, contact with the molten metal and exclude atmospheric air. The arrangement and character of the orifice determines somewhat the economy in the use of hydrogen. I have used gas pressures of from about 5 pounds to 10 pounds and an amount of hydrogen of about 30 cubic feet per hour. An excess amount of gas is not detrimental and under proper conditions the amount may be reduced. The stream of hydrogen is preferably ignited or lighted before welding is begun. The arc is then struck by touching the electrode against the work and withdrawing the same, as in arc welding in air. The velocity with which the hydrogen is delivered should be sufficient so that the gas is not blown away from the arc or the work.

The welding arc maintained between the work and the electrode in the hydrogen atmosphere has peculiar properties and is characteristically distinguished from any other welding arc with which I am familiar. As heretofore stated where direct current is used and the positive side of the welding circuit connected to the work, so that the crater of the arc is in the metal of the work, a stable arc may be continuously maintained provided the welding circuit has a striking voltage greater than 120 volts. As heretofore stated in order to maintain the arc easily and permit a considerable adjustment of the arc length and enable bare as well as flux coated electrodes to be used I prefer to use a welding circuit having a striking voltage of 180 to 200 volts for commercial applications. The welding arc maintained between the work and the electrode in an atmosphere of hydrogen greatly increases the speed and efficiency of welding over arc welding in air. The work is not heated only by the direct action of the arc but the heating effect is greatly increased over the welding arc in air by reason of the hydrogen atmosphere. The fact that the arc is maintained between a pool of molten metal and the electrode seems to be of advantage in enabling a stable arc to be maintained in hydrogen and particularly where the work is the positive or anode. The crater thus being in the work, a preponderance of the heat produced by the direct action of the arc is in the work. The dimensions of the crater of the welding arc in hydrogen are about double the dimensions in air. The pool of molten metal is subjected to the direct action of the stream of hot hydrogen and hydrogen is probably also continuously brought into contact with the molten metal by diffusion. A large amount of hydrogen in some form is taken up by the molten metal as is evidenced by the fact that a stream of bubbles comes from the surface of the molten metal at the edge of the crater. This occluded gas is given off just before the solidification of the metal and the deposited metal is thus washed by the gas just before the metal solidifies. The conditions are such that the last traces of oxygen coming from scale on the plates to be welded or contained in the plates in the form of oxide or occluded in the plates, are removed and the deposited metal solidifies in a state of great purity.

In my welding of steel plates I have observed that with a given welding current when the arc is very short, for example, of the order of $\frac{1}{16}$ inches in length, the metal appears to be transferred to a large extent by the passage of globules of metal and the rate of deposition seems then to be almost independent of small variations in the arc length. As the arc length is increased the globular deposition largely disappears and the arc becomes more nearly a pure ionic arc. The rate of deposition increases with the lengthened arc and reaches a maximum when the arc is about $\frac{3}{16}$ inches in length. Further increases in the arc length do not correspondingly increase the rate of deposition but, on the contrary, the rate of deposition falls to almost nothing when the arc reaches about $\frac{1}{2}$ inch in length. A globule of metal can bridge the distance between the electrode and the work for the short arc lengths only. For any given arc length the rate of deposition may be adjusted by varying the welding current. Since long arc lengths may be used without damage to the deposited metal the operator has available a wide range of adjustment of electrical conditions to suit the work to be done. Moreover, the operator, in hand or semi-automatic welding with a substantially constant rate of electrode feed, can control the rate of deposition merely by varying the arc length.

The appearance of what I have referred to as the ionic arc when welding steel in hydrogen with the work positive is indicated in Fig. 1. The arc seems to be composed of a well defined arc core 20 which appears as a bright narrow band issuing from the tip of the electrode and terminating in the crater. The crater end of the band travels continuously over the surface of the crater. This arc core has a white incandescent aspect and is enveloped by a thin sheath of red color. Around this main current-carrying part or core of the arc there are well defined streamers 21 which appear to start in a substantially perpendicular direction from the hottest point on the tip of the electrode and terminate somewhere on the edges of the crater. They are of a bright white color and have the same appearance as the tracks of Alpha particles ejected from radio-active substances. There is an irregularly shaped flame enveloping the projecting portion of the electrode and the arc and surrounding the molten metal of the work as suggested by the illustration of Fig. 1. This flaming enevelope contains hydrogen, a part of which is burning in contact with the air and contains vapors coming from the crater. Atmospheric air is thus excluded from the arc and the molten portion of the work, and metal transferred through the arc, as well as the molten metal of the work, is not only protected from action of the elements of atmospheric air but is subjected to an energetic reducing action.

I have not illustrated the details of the electrode feeding mechanism and the flexible guide tube arrangement shown in Fig. 1 since these parts are well known in the art of arc welding in air. Such apparatus is shown for example in Letters Patent to Noble, No. 1,508,711, dated September 16, 1924. In this type of apparatus the operator manually holds or guides the welding device or tool over the work to be welded and automatic means continuously feeds the metallic electrode from the tool toward the work to maintain the arc. In such apparatus the rate at which the electrode is fed may be automatically regulated to maintain the arc length substantially constant. The Letters Patent to Noble just referred to show arrangements for thus automatically controlling the rate of electrode feed in accordance with an electrical characteristic of the arc which varies with the arc length. An arrangement is there illustrated wherein the electrode feed rolls are driven by an electric motor connected so that its speed is responsive to the voltage across the arc. When the arc voltage rises upon an increase in the length of the arc, the motor drives the feed rolls more rapidly and when the arc shortens, the motor drives the feed rolls more slowly. The electrode is thus fed through the tool toward the work at the proper rate to maintain the arc length substantially constant. During welding the operator moves the tool over the work to deposit metal along the line of the joint to be welded. To convert such an apparatus or the apparatus of my Fig. 1, which is used in the same way, into a fully automatic machine, it is merely necessary to provide suitable means for automatically producing relative movement between the electrode and the work along the line of the joint to be welded. The electrode will thus not only be fed automatically to maintain the arc, but the movement along the joint to be welded will also be effected automatically. The line of the joint may, of course, be straight or curved. An example of a fully automatic machine utilizing the flexible guide tube arrangement is shown in Letters Patent to Glasser, 1,508,690, dated September 16, 1924.

When using the arrangement of Fig. 1 for semi-automatic welding the operator does not need to come into electrical contact with the current carrying parts of the electrode delivery tool since the parts of the tool held in the hand of the operator may be suitably insulated. Direct current voltages of the order of 200 volts are moreover, harmless to the operator.

I have used both dry hydrogen and undried electrolytically produced hydrogen, which is substantially saturated with water vapor, with perfectly successful results.

Fig. 2 shows a modification of the welding tool wherein the hydrogen is led into the member 22 secured to the member 23. The electrode and gas delivery nozzle 24 is provided with openings 25 which discharge the gas to enevelope the arc and play upon the work as heretofore described.

Fig. 3 indicates a further modification in which the flexible electrode guide tube 7 which may be a metallic steam tight hose, is surrounded by a flexible insulating tube, for example a rubber tube 26. In this figure the conductor for leading welding current to the tool and at the tool into the electrode, is shown at 27. The insulating tube 26 serves the purpose of conducting the gas to the welding tool and also serves to insulate the current-carrying conductor from the ground. The body 28 of the tool and nozzle 29 are indicated as provided with radiating ribs to assist in keeping the tool cool. An opening 30 leads the gas through the member 28. The member 31 is shown adequately threaded into the member 28 and the gas is discharged through the annular orifice 32 between the members 29 and 31.

Fig. 4 shows a further modification wherein a hood 33 is secured to the member 34 of the tool. This hood may be made of any suitable material, for example asbestos, and means, for example a quartz cover 35, may be provided for observation purposes if desired. As indicated in Fig. 4 the hydrogen is discharged through openings 36. Additional openings 37 may be provided to assist in filling the hood with hydrogen but these additional openings are not essential.

In Fig. 5 I have diagrammatically indicated an arrangement for hand welding in an atmosphere of hydrogen. In this figure the electrode 1' is indicated as held in a holder 38 as in ordinary metallic or carbon arc welding in air. An asbestos hood 39 provided with an open top 40 is placed over the portion of the work 8 which is being welded. Hydrogen is supplied to the interior of the hood 39 through a connection 41. The hydrogen burns for a short distance above the opening 40 which is provided in the hood so that the operator may manipulate the electrode to strike and maintain the arc. The electrode may be either a metallic electrode or a carbon electrode, as heretofore described. The hydrogen atmosphere surrounds the arc and contacts with the molten portion of the work and excludes atmospheric air. The particular arrangement indicated in Fig. 5 is not as economical of hydrogen as are the arrangements previously described but I have produced perfectly successful welds with such apparatus and the deposited metal is sound and ductile.

While it is necessary to have a striking voltage greater than 120 volts to strike and maintain an arc in the hydrogen atmosphere, arrangements may be provided whereby the voltage is maintained at a relatively low value except when the electrode is manipulated to begin welding. One such arrangement for a direct current system is indicated in Fig. 5, wherein the welding source is indicated as a direct current generator 42 provided with a shunt type exciting winding 43 and a series cumulatively wound winding 44. One terminal of the generator is shown connected to the work 8 and the other terminal to the electrode 1', through a stabilizing resistor 45 and reactance 46. When the welding circuit is open between the work and the welding pencil or electrode, there is no current through the series winding 44 and the voltage of the generator is only that produced by the winding 43, and may be made relatively low. Whenever the electrode is touched to the work to start the arc and as long as the welding arc is maintained, the welding current flows through the series winding 44 which assists the winding 43 to raise the generator voltage to the desired value for striking and maintaining the arc. The generator may be designed so that the winding 44 with a current through the welding circuit considerably smaller than normal will maintain the magnetic circuit of the generator substantially saturated. Variations of current due to ordinary variations in the arc length will therefore not appreciably change the voltage of the generator which during welding acts as an ordinary constant potential type of source. A sufficiently high striking voltage is therefore always available to strike and maintain the arc but the voltage is reduced to a relatively low value whenever the welding circuit is intentionally interrupted by the operator. Where the arc is supplied from a variable voltage type of source as distinguished from the constant potential type other arrangements may be provided for maintaining a low voltage when the arc is interrupted and maintaining the proper striking voltage during welding. Such voltage adjusting means constitute special features and become of practical importance more particularly where the electrical conditions of the welding circuit are such as to subject the operator to a dangerous shock. Such means would be desirable for example if an alternating current supply circuit, with its relatively higher striking voltage, were used.

Arc welding in hydrogen as heretofore described may thus be accomplished by simple hand welding or by the use of semi-automatic or fully automatic machines and either a metallic or carbon electrode or pencil may be used. Where a carbon electrode is used the rate at which the electrode wears away is so low that the feeding of the electrode is a simple matter in an automatic machine, and may be accomplished by any suitable means, examples of which are well known in the art, as shown by Letters Patent to Hall & Metzger No. 996,406, dated June 27, 1911 and Wagner No. 1,305,039 dated May 27, 1919.

My invention is to be distinguished from work which has been done in treating bottles as shown, for example, in Letters Patent to Howell No. 1,022,553 dated April 9, 1912, and in British Letters Patent to Thomson No. 27,714 of 1904. In such work the arc is drawn and quickly interrupted in an atmosphere of nitrogen, hydrogen or a mixture of gases. A brief or momentary localized heating effect is utilized to produce a small globule of metal to secure small articles together, but there is no maintained arc between an electrode or pencil and a pool of molten metal and the molten metal is not subjected to any reducing action of hydrogen at high temperature as in my process.

The application of Irving Langmuir, Serial No. 729,185, filed July 30, 1924, for Heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

What I claim as new and desire to secure by Letters Patent of the United States, is:

1. The method of electric arc welding which comprises maintaining a welding arc between a pool of molten metal on the work to be welded, constituting one electrode, and a welding pencil constituting the other electrode and maintaining a gaseous medium comprising sufficient hydrogen surrounding the arc and in contact with the molten portion of the work to exclude atmospheric air and exert a strong reducing action on the molten metal of the work.

2. The method of electric arc welding which comprises maintaining a direct current welding arc between a pool of molten metal on the work to be welded, constituting one electrode, and a welding pencil constituting the other electrode while passing the welding current in such a direction as to develop a preponderance of heat in the work and maintaining a gaseous medium comprising sufficient hydrogen surrounding the arc and in contact with the molten portion of the work to exclude atmospheric air and exert a strong reducing action on the molten metal of the work.

3. The method of producing ductile welds in metal work by the electric arc process which comprises fusing the work by a direct current welding arc maintained between the work and an electrode, the work being positive and the electrode negative, and supplying sufficient hydrogen to wash the molten portion of the work with hydrogen in an active reducing condition and exclude atmospheric air from the arc and molten portion of the work while the hydrogen burns in contact with the surrounding air.

4. The method of producing ductile welds in metal work by the electric arc process which comprises maintaining a welding arc between a pool of molten metal on the work to be welded, and a welding pencil comprising metal adapted to be deposited upon the work and integrally united therewith and supplying a stream of gaseous medium comprising sufficient hydrogen to surround the arc and play upon the work to purify the molten metal and exclude atmospheric air from the arc and molten portion of the work while burning in contact with the surrounding air.

5. The method of depositing purified metal by the electric arc process of the type wherein an arc is maintained between a metallic electrode and a pool of molten metal and wherein the electrode is fused and vaporized and the metal thereof deposited into the pool and solidified, characterized by the fact that a gaseous medium comprising sufficient hydrogen is maintained surrounding the arc and in contact with the molten metal to exclude atmospheric air and exert a strong reducing action on the molten metal.

6. The method of welding by the electric arc process of the type wherein a welding arc is maintained between a metallic electrode and a pool of molten metal on the work and wherein the electrode is fused and vaporized and the metal thereof deposited upon the work and integrally united therewith, which consists in supplying a gaseous medium consisting of a simple gas non-reactive to form compounds with the metal being welded and having a strong reducing action upon compounds of the metal being welded which tend to make the weld brittle, said gaseous medium being maintained surrounding the arc and in contact with the molten portion of the work whereby atmospheric air is excluded and a ductile weld produced.

7. Apparatus for electric arc welding of the type wherein the work to be welded constitutes one electrode and a welding pencil constitutes the other electrode comprising means for maintaining a welding arc between the pencil and a pool of molten metal on the work, a source of hydrogen and means arranged to supply hydrogen from said source to surround the arc and maintain a gaseous medium comprising sufficient hydrogen in contact with the molten portion of the work to exclude atmospheric air and exert a strong reducing action on the molten metal of the work.

8. Apparatus for electric arc welding of the type wherein the work to be welded constitutes one electrode and a welding pencil constitutes the other electrode and wherein the welding arc is maintained between the pencil and a pool of molten metal on the work, comprising a direct current welding circuit having a striking voltage greater than 120 volts, the positive side of which is connected to the work and the negative side of which is connected to the pencil, a source of hydrogen and means for directing a stream of hydrogen from said source upon the molten metal of the work to exclude atmospheric air from the arc and the molten portion of the work and exert a strong reducing action upon the molten metal of the work.

9. Apparatus for electric arc welding of the type wherein the welding arc is maintained between the work to be welded and a metallic electrode, comprising an electrode delivery device, means for feeding the electrode continuously through said delivery device to maintain the arc, means for supplying a gaseous medium comprising hydrogen to said delivery device, said device being provided with means for discharging the gaseous medium so as to envelop the arc in an atmosphere comprising hydrogen and play the said gaseous medium upon the molten portion of the work and exclude atmospheric air.

10. The method of electric arc welding which comprises maintaining an arc between the work constituting one electrode and a metallic welding pencil constituting the other electrode and maintaining a gaseous medium comprising sufficient hydrogen surrounding the arc and in contact with the molten portions of the work to exclude atmospheric air and exert a strong reducing action on the molten metal of the work, while maintaining the arc sufficiently long to transfer the metal of the welding pencil to the work substantially without the passage of globules of metal.

In witness whereof, I have hereunto set my hand this twentieth day of December, 1924.

PETER P. ALEXANDER.